United States Patent [19]
Hasegawa

[11] Patent Number: 5,305,660
[45] Date of Patent: Apr. 26, 1994

[54] SHIFT KNOB

[75] Inventor: Hiroyasu Hasegawa, Aichi, Japan

[73] Assignee: Kabushiki Kaisha Tokai Rika Denki Seisakusho, Aichi, Japan

[21] Appl. No.: 6,154

[22] Filed: Jan. 19, 1993

Related U.S. Application Data

[63] Continuation of Ser. No. 804,926, Dec. 11, 1991, abandoned.

[30] Foreign Application Priority Data

Dec. 28, 1990 [JP]  Japan ................................. 2-405981

[51] Int. Cl.⁵ .............................................. B60K 20/00
[52] U.S. Cl. ....................................... 74/553; 74/543;
   74/538; 74/523; 74/551.9; 16/114 R
[58] Field of Search ................ 74/552, 553, 558, 523,
   74/543, 548, 473 R, 551.8; 70/201, 247, 202;
   29/463; 200/61.88; 16/110 R, 111 R, 114 R,
   D12, D19, D24

[56] References Cited

U.S. PATENT DOCUMENTS

| | | | |
|---|---|---|---|
| 3,204,481 | 9/1965 | Golden | 74/543 |
| 3,484,808 | 12/1969 | Conterno | 74/54.3 |
| 3,759,180 | 9/1973 | Gibbons et al. | 29/463 |
| 3,795,156 | 3/1974 | Neuscheler | 74/523 |
| 3,998,109 | 12/1976 | O'Brien | 74/558 |
| 4,466,309 | 8/1984 | Matey | 74/551.9 |
| 4,747,278 | 5/1988 | Roncelli et al. | 74/558 |
| 4,896,556 | 1/1990 | Takada | 74/553 |
| 4,896,558 | 1/1990 | Meier et al. | 74/548 |
| 4,909,096 | 3/1990 | Kobayashi | 74/543 |
| 5,020,390 | 6/1991 | Chang | 74/608 |

Primary Examiner—Carl D. Friedman
Assistant Examiner—Winnie Yip
Attorney, Agent, or Firm—Finnegan, Henderson, Farabow, Garrett & Dunner

[57] ABSTRACT

A knob body of a rigid resin is divided at a generally central portion thereof in front and rear directions into a first knob division portion and a second knob division portion. A button insertion tubular portion and a mounting tubular portion are formed integrally with the first knob division portion, and a shell is provided to cover the outer periphery of the knob body. The first and second knob division portions are molded separately from each other, and by doing so, the thickness can be made thin.

6 Claims, 2 Drawing Sheets

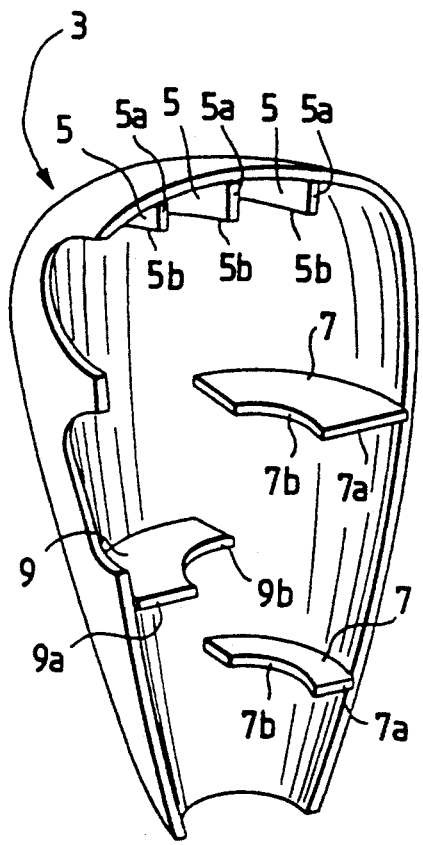
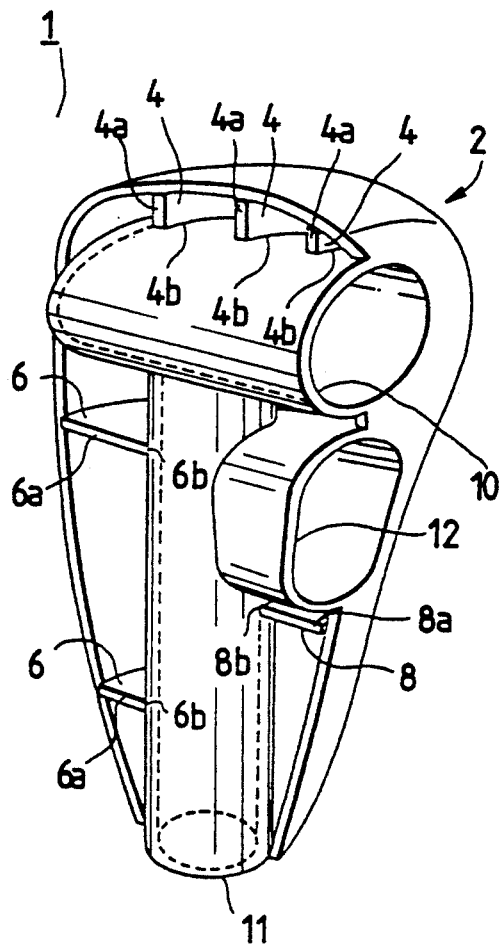
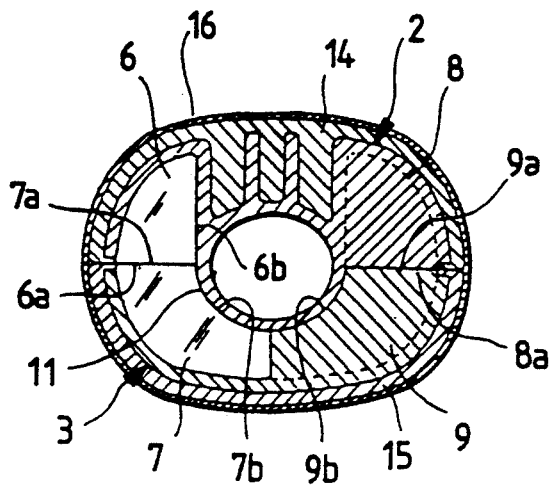

SHIFT KNOB

This application is a continuation of application Ser. No. 07/804,926 filed Dec. 11, 1991, now abandoned.

BACKGROUND OF THE INVENTION

This invention relates to a shift knob integrally molded of a resin by a mold.

Among conventional shift knobs for an automatic speed change gear of an automobile, there is known a shift knob which is integrally molded of a resin by a mold. More specifically, its outer shape portion, as well as a button insertion tubular portion disposed at an upper portion and open to the side, is molded by a split mold dividable right and left, and a mounting hole portion for receiving a shift lever is formed by a vertically movable mold portion provided in the mold, in such a manner that the mounting hole portion generally perpendicularly intersects the button insertion portion.

In the above shift knob, for molding reasons, the resin is filled in all the portions surrounding the button insertion tubular portion and the mounting tubular portion, which results in a problem that much material is required, so that the weight is heavy.

SUMMARY OF THE INVENTION

The present invention has been made under the above circumstances, and an object of the invention is to provide a shift knob which can save the material to achieve a lightweight construction.

According to the present invention, there is provided a shift knob comprising a knob body of a rigid resin divided at a generally central portion thereof in front and rear directions into two portions; a button insertion tubular portion which is formed integrally on an upper portion of one of said knob division portions, and is open to the side; a mounting tubular portion formed integrally on said one knob division portion and generally perpendicularly intersecting said button insertion tubular portion, a shift lever being adapted to be inserted into said mounting tubular portion; and a shell portion covering the outer periphery of said knob body.

In the shift knob of the present invention, the knob body is divided into the two portions, that is, comprises the knob division portion having the button insertion tubular portion and the mounting tubular portion, and the other knob division portion. Therefore, the thickness of the knob body can be made uniform and thin, and since the shell portion is provided to cover the outer periphery of the knob body, the joint between the two knob division portions is not exposed.

BRIEF DESCRIPTION OF THE DRAWINGS

FIGS 1a and 1b are exploded perspective views of a knob body of a first embodiment of the present invention;

FIG. 2 is a transverse cross-sectional view of the entire construction;

DETAILED DESCRIPTION OF THE PREFERRED EMBODIMENTS

Figure 3:
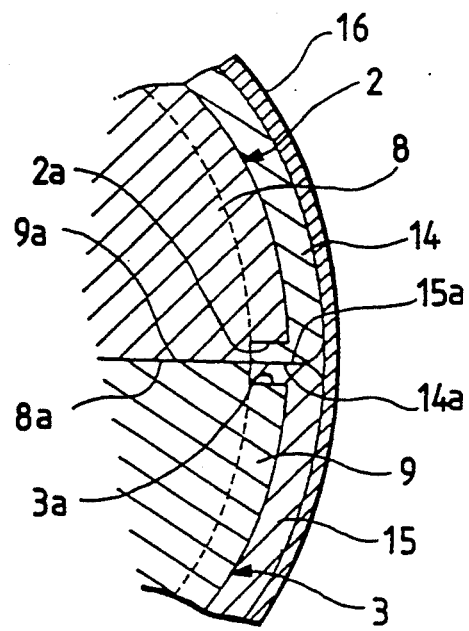
FIG. 3 is an enlarged view of a portion of FIG. 2.

A first embodiment of the present invention will now be described with reference to FIGS. 1 to 3.

A knob body 1 of a rigid resin is divided at a generally central portion thereof in front and rear directions into two portions, that is, a first knob division portion 2 and a second knob division portion 3. Three ribs 4 are formed on the inner surface of the upper portion of the first knob division portion 2, and extend in the longitudinal direction, and three ribs 5 are formed on the inner surface of the upper portion of the second knob division portion 3, and extend in the longitudinal direction. End surfaces 4a of the ribs 4 are projected slightly from an end surface 2a of the first knob division portion 2, and end surfaces 5a of the ribs 5 are projected slightly from an end surface 3a of the second knob division portion 3. Two ribs 6 are formed on the inner surface of the lower portion of the first knob division portion 2 at one side portion thereof, and extend in a transverse direction, and are vertically spaced from each other. Two ribs 7 are formed on the inner surface of the lower portion of the second knob division portion 3 at one side portion thereof, and extend in a transverse direction, and are vertically spaced from each other. End surfaces 6a of the ribs 6 are projected slightly from the end surface 2a of the first knob division portion 2, and end surfaces 7a of the ribs 7 are projected slightly from the end surface 3a of the second knob division portion 3. A rib 8 is formed on the inner surface of the lower portion of the first knob division portion 2 at the other side thereof, and extends in the transverse direction, and is disposed at a height intermediate the ribs 6. A rib 9 is formed on the inner surface of the lower portion of the second knob division portion 3 at the other side thereof, and extends in the transverse direction, and is disposed at a height intermediate the ribs 7. An end surface 8a of the rib 8 is projected slightly from the end surface 2a of the first knob division portion 2, and an end surface 9a of the rib 9 is projected slightly from the end surface 3a of the second knob division portion.

A button insertion tubular portion 10 is formed on the upper portion of the first knob division portion 2, and is open to the right side thereof. The outer peripheral portion of the tubular portion 10 is connected to lower end surfaces 4b of the three upper ribs 4, so that the tubular portion 10 is integral with the first knob division portion 2. Although not shown in the drawings, a detent button of an automatic speed change gear is adapted to be inserted into the tubular portion 10. A mounting tubular portion 11 is formed on the first knob division portion 2, and perpendicularly intersects the button insertion tubular portion 10. The outer peripheral portion of the mounting tubular portion 11 is connected to side portions 6b and 6b of the ribs 6 and 6 and a side portion 8b of the rib 8, so that the mounting tubular portion 11 is integral with the first knob division portion 2. Although not shown in the drawings, a shift lever is adapted to be inserted into the mounting tubular portion 11. A switch receiving tubular portion 12 is formed integrally with the first knob division portion 2, and is disposed below the button insertion tubular portion 10. This tubular portion is also open to the right side, and an overdrive switch (not shown) of the automatic speed change gear is adapted to be received therein. Two ribs 13 are formed on the outer side of the first knob division portion 2, and extend longitudinally along the outer peripheral portion of the mounting tubular portion 11.

Each of the first and second knob division portion 2 and 3 is integrally molded by a two-split mold dividable in front and rear directions. Particularly, the mold for molding the first knob division portion 2 comprises a movable mold portion movable in right and left directions for molding the button insertion tubular portion 10 and the switch receiving tubular portion 12, and a movable mold portion movable in upward and downward directions for molding the mounting tubular portion 11. Further, a first shell portion 14 of a soft resin is molded on the outer periphery of the first knob division portion 2 to cover the same, and an end portion 14a of this shell portion covers the end surface 2a. Similarly, a second shell portion 15 of a soft resin is molded on the outer periphery of the second knob division portion 3 to cover the same, and an end portion 15a of this shell portion covers the end surface 3a.

The first and second knob division portions 2 and 3 are integrally connected together by screws (not shown), with the end portions 14a and 15a of the shell portions 14 and 15 abutted against each other. In this case, with respect to the ribs 4 to 9, the end surfaces 4a are abutted respectively against the end surfaces 5a, and the end surfaces 6a are abutted respectively against the end surfaces 7a, and the end surface 8a is abutted against the end surface 9a. Also, lower end surfaces 5b of the three ribs 5 of the second knob division portion 3 are abutted against the outer peripheral portion of the button insertion tubular portion 10, and side portions 7b of the ribs 7 and side portions 9b of the rib 9 are abutted against the mounting tubular portion 11. Thus, these ribs serve to increase the strength of the knob body 1 serving as a structural member.

As shown in FIG. 2, an outer covering member 16 of real leather, synthetic leather or the like serving as an outer shell is fitted on the outer periphery of the knob body 1 of the above construction having the shell portions 14 and 15.

The above embodiment of such a construction achieves the following advantageous effects. Namely, the knob body 1 is divided into the two portions, that is, the first knob division portion 2 and the second knob division portion 3, and the button insertion tubular portion 10 and the mounting tubular portion 11 are formed integrally with the first knob division portion 2. Therefore, the thickness of the knob body 1 can be made uniform and thin over the entire area thereof, and therefore the material can be saved, also and a lightweight design can be obtained, as compared with the prior art. Further, since the shell portions 14 and 15 of the first and second knob division portions 2 and 3 are covered with the outer covering member (the outer shell) 16, the joint between the shell portions 14 and 15, which is the joint between the knob division portions 2 and 3, is not exposed to the exterior.

Figure 4:
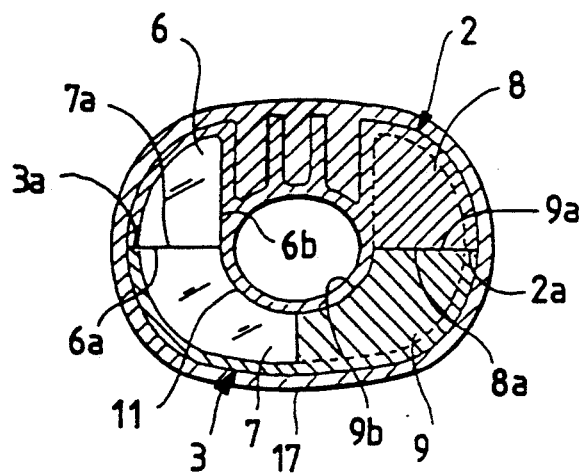
FIG. 4 is a view similar to FIG. 2, but showing a second embodiment of the invention.

FIG. 4 shows a second embodiment of the present invention which differs from the preceding embodiment in that end surfaces 4a, 6a and 8a of ribs 4, 6 and 8 of a first knob division portion 2 are flush with an end surface 2a of the knob division portion 2, that end surfaces 5a, 7a and 9a of ribs 5, 7 and 9 of a second knob division portion 3 are flush with an end surface 3a of the knob division portion 3, that these knob division portions 2 and 3 are joined together to provide a knob body 1, and that an outer shell 17 of a soft resin is molded on the outer periphery of this knob body.

In this second embodiment, there is no need to provide the outer covering member 16 used in the first embodiment. Although the joint between the knob division portions 2 and 3 is covered with the outer shell 17, and therefore is prevented from being exposed to the exterior, the outer covering member 16 may be further fitted on the outer shell 17 for the purpose of enhancing a design effect.

The present invention is not limited to the above embodiments. For example, although the first knob division portion 2 and the second knob division portion 3 are connected together by the screws (not shown), resilient pawls may be provided on one of the knob division portions 2 and 3 whereas engaging recesses are provided in the other, in which case they are snap-fitted together. Various modifications can be made without departing from the scope of the invention.

The shift knob of the present invention comprises the knob division portion which has the button insertion tubular portion open to the side of the knob body, and the mounting tubular portion perpendicularly intersecting the button insertion tubular portion and adapted to receive the shift lever therein, and the other division portion, and the shell portion is provided to cover the outer periphery of the knob body. Therefore, advantageously, the material can be saved, and also the lightweight design can be achieved.

What is claimed is:

1. A shift knob comprising:
    a knob body of a rigid resin including first and second portions joined along a generally central longitudinal axis;
    a button insertion tubular portion formed unitarily on an upper portion of said first knob portion, said button insertion tubular portion opening to a side of the knob body;
    a mounting tubular portion formed integrally on said first knob portion and generally perpendicularly intersecting said button insertion tubular portion; and
    a shell portion covering an outer periphery of said knob body.

2. A shift knob as claimed in claim 1, further comprising:
    rib means for supporting at least one of an outer peripheral portion of said button insertion tubular portion and said mounting tubular portion, said rib means formed on an inner surface of said knob body.

3. A shift knob as claimed in claim 2, further comprising:
    an outer covering member surrounding said shell portion.

4. A shift knob, comprising:
    a rigid knob body having first and second knob portions joined along a generally central longitudinal axis, said first and second knob portions being substantially hollow and having inner and outer surfaces;
    a first tubular portion integral with the inner surface of said first knob portion, said first tubular portion having a longitudinal axis transverse to the central longitudinal axis of the knob body and having an opening flush with said outer surface of said first knob portion;
    a second tubular portion integral with the inner surface of said first knob portion, said second tubular portion aligned with the central longitudinal axis of the knob body and intersecting said first tubular portion; and
    a shell portion covering an outer peripheral surface of said knob body, said outer surface including the outer surfaces of said first and second knob portions.

5. The shift knob of claim 4, further comprising rib means integral with the inner surface of said first knob portion for supporting said first and second tubular portions of said first knob portion.

6. The shift knob of claim 4, further comprising a third tubular portion parallel to said first tubular portion and having an opening adjacent the opening of said first tubular portion.

* * * * *